United States Patent
Kondoh

(10) Patent No.: US 8,401,788 B2
(45) Date of Patent: Mar. 19, 2013

(54) ANGULAR VELOCITY SENSOR CORRECTING APPARATUS AND METHOD

(75) Inventor: Takahiro Kondoh, Kanagawa-ken (JP)

(73) Assignee: JVC Kenwood Corporation, Yokohama-shi (JP)

( * ) Notice: Subject to any disclaimer, the term of this patent is extended or adjusted under 35 U.S.C. 154(b) by 558 days.

(21) Appl. No.: 12/569,449

(22) Filed: Sep. 29, 2009

(65) Prior Publication Data
US 2010/0082250 A1  Apr. 1, 2010

(30) Foreign Application Priority Data
Sep. 29, 2008 (JP) ................................. 2008-250543

(51) Int. Cl.
*G01C 21/10* (2006.01)
(52) U.S. Cl. .......... 701/505; 701/500; 701/509; 701/518
(58) Field of Classification Search .................. 701/500, 701/505, 509, 518, 534, 535
See application file for complete search history.

(56) References Cited

U.S. PATENT DOCUMENTS

| | | | | |
|---|---|---|---|---|
| 5,235,514 A | * | 8/1993 | Matsuzaki | 701/501 |
| 5,278,424 A | * | 1/1994 | Kagawa | 250/559.37 |
| 5,296,855 A | * | 3/1994 | Matsuzaki et al. | 340/988 |
| 5,331,563 A | * | 7/1994 | Masumoto et al. | 701/530 |
| 5,416,477 A | * | 5/1995 | Shibata | 340/988 |
| 5,469,158 A | * | 11/1995 | Morita | 340/988 |
| 5,742,925 A | * | 4/1998 | Baba | 701/469 |

FOREIGN PATENT DOCUMENTS

| | | |
|---|---|---|
| JP | 2-038916 A | 2/1990 |
| JP | 9-152338 A | 6/1997 |
| JP | 10-019585 A | 1/1998 |
| JP | 2000-149755 | 11/2001 |

OTHER PUBLICATIONS

European Search Report dated Dec. 5, 2012 issued in corresponding European Patent Application No. 09012112.0.

* cited by examiner

*Primary Examiner* — Khoi Tran
*Assistant Examiner* — Nicholas Kiswanto
(74) *Attorney, Agent, or Firm* — Venable LLP; Michael A. Sartori; Ryan M. Flandro

(57) ABSTRACT

A GPS measuring unit receives a signal from a GPS satellite and outputs GPS measurement data including at least orientation of an object. An angular velocity sensor outputs angular velocity of the object. An offset value computing unit estimates a running condition of the object on the basis of the measurement data and the angular velocity. The offset value computing unit sequentially derives a temporary offset value of the angular velocity sensor in accordance with the estimated running condition of the object. The offset value computing unit derives an offset value of the angular velocity sensor by executing statistical process on the temporary offset value of the angular velocity sensor. A forgetting factor in the statistical process is changed according to the running condition of the object.

4 Claims, 7 Drawing Sheets

| RUNNING CONDITION | FORGETTING FACTOR |
|---|---|
| STOP STATE | $\alpha 1$ |
| STRAIGHT RUNNING STATE | $\alpha 1$ |
| NON-STRAIGHT-RUNNING STATE | $\alpha 2 (\alpha 2 < \alpha 1)$ |

76

| CONDITION | FORGETTING FACTOR |
|---|---|
| X HOURS OR SHORTER | $\alpha 10$ |
| LONGER THAN X HOURS | $\alpha 11 (\alpha 11 < \alpha 10)$ |

| RUNNING CONDITION | FORGETTING FACTOR |
|---|---|
| STOP STATE | $\alpha 1$ |
| STRAIGHT RUNNING STATE | $\alpha 2 (\alpha 2 < \alpha 1)$ |
| NON-STRAIGHT-RUNNING STATE | $\alpha 3 (\alpha 3 < \alpha 2)$ |

76

ANGULAR VELOCITY SENSOR CORRECTING APPARATUS AND METHOD

CROSS-REFERENCE TO RELATED APPLICATIONS

The present application claims the priority benefit of Japanese patent application number 2008-250543 filed Sep. 29, 2008, the disclosure of which is incorporated herein by reference.

BACKGROUND OF THE INVENTION

1. Field of the Invention

The present invention relates to an angular velocity sensor correcting technique and, more particularly, to an angular velocity sensor correcting apparatus and an angular velocity sensor correcting method for deriving a value for correcting an output signal from an angular velocity sensor.

2. Description of the Related Art

In a navigation apparatus for a vehicle, an optimum position is generally estimated by combining a position calculated by self-contained navigation and a position calculated from a Global Positioning System (GPS). In the self-contained navigation, by updating a measured position of last time on the basis of a speed pulse indicative of the velocity of the vehicle and turn angle velocity of the vehicle measured by an angular velocity sensor, the present position is calculated. By a navigation apparatus of such a system, the position of the vehicle can be derived by self-contained navigation even in a tunnel, an underground parking area, and an area between tall buildings where it is difficult to receive radio waves from a GPS satellite. An angular velocity ω accompanying a turn of a vehicle is derived by the following equation:

$$\omega = (Vout - Voffset)/S \tag{1}$$

In the equation, Vout denotes output voltage of an angular velocity sensor, Voffset denotes an offset value of the angular velocity sensor, and S (mV/deg/sec) denotes an angular velocity conversion coefficient of the angular velocity sensor.

To accurately obtain angular velocity, an offset value and the angular velocity conversion coefficient of the angular velocity sensor have to be obtained accurately. The angular velocity conversion coefficient of the angular velocity sensor varies, generally, according to the individual difference of the angular velocity sensor and the angle of attachment to the vehicle of the angular velocity sensor. There is the possibility that the offset value changes according to a temperature change. That is, the offset value is subjected to the influences of temperature rise caused by heat generation of a substrate or the like used for a navigation apparatus for a vehicle and heat generation of a vehicle engine or the like in the case where the navigation apparatus for a vehicle is attached to the dashboard of the vehicle. Hitherto, an offset value of an angular velocity sensor is corrected by using an output voltage from the angular velocity sensor at the time of stop or straight running of the vehicle when the angular velocity is "0". However, in the case where the frequency of stop of the vehicle is low such as running on an expressway or long-time running in an area where a traffic amount is small, it is difficult to periodically correct the offset value of the angular velocity sensor. The precision of the offset value tends to deteriorate. Correction of an offset value at the time of straight running when an output voltage from an angular velocity sensor accurately is "0" is easily influenced by the shape of a road and the driving state of the driver, so that it is difficult to periodically perform the correction. The angular velocity conversion coefficient of the angular velocity sensor is derived from an orientation change amount in a unit period and an output voltage of the angular velocity sensor. Consequently, as it is obvious from the equation (1), the angular velocity conversion coefficient of the angular velocity sensor is influenced by an error of the offset value.

A technique of correcting an offset of the angular velocity sensor and the angular velocity conversion coefficient even during running other than the straight running is proposed. In the technique, on the basis of an average value of output voltages of the angular velocity sensor in a predetermined period and the orientation change amount of the vehicle in the period in which the average value is calculated, the offset value and the angular velocity conversion coefficient of the angular velocity sensor are corrected. Concretely, an offset value Voffset of the angular velocity sensor is derived as follows:

$$Voffset = 1/n \cdot \Sigma Vout - 1/\Delta t \cdot \Delta\theta/n \cdot S \tag{2}$$

In the equation, "n" denotes the number of samples of the output voltage of the angular velocity sensor, Δt (sec) denotes sampling interval, and Δθ(deg) denotes an orientation change amount. The orientation change amount is obtained on the basis of a GPS orientation obtained from a GPS satellite or map data. The angular velocity conversion coefficient of the angular velocity sensor is derived as follows in a state where a change amount of a corrected offset amount is small, that is, in a stable state:

$$S = (1/n \cdot \Sigma Vout - Voffset) \cdot n/\Delta\theta \cdot \Delta t \tag{3}$$

In the equation, Voffset is known and a constant in a stable state where a change amount of a corrected offset amount is small as illustrated in, for example, laid open Japanese patent application number 2001-330454.

Under such situations, when the number of samples is increased since Voffset in the equation (3) is not stable until the stable state is obtained in which the change amount of the offset value is small with respect to the angular velocity conversion coefficient of the angular velocity sensor, there is the possibility that an error in the angular velocity conversion coefficient increases. Until the offset value becomes stable, generally, it takes 30 minutes to one hour or longer since startup. Consequently, for example, in running of about 30 minutes or less, it is very difficult to accurately correct the angular velocity conversion coefficient of the angular velocity sensor, and precision of deriving the angular velocity is not high. To improve the precision of deriving the angular velocity in short time since startup, it is requested to derive the offset value of the angular velocity sensor in short time.

SUMMARY OF THE INVENTION

The present invention has been achieved in view of such situations and a general purpose of the invention is to provide a technique of improving precision of deriving angular velocity even in short time since startup.

To solve the problem, an angular velocity sensor correcting apparatus as an aspect of the present invention includes: an obtaining unit operative to obtain measurement data of an object measured on the basis of a signal from a GPS satellite and angular velocity of the object output from an angular velocity sensor; an estimating unit operative to estimate a running condition of the object on the basis of the measurement data and the angular velocity obtained by the obtaining unit; an offset value deriving unit operative to sequentially derive a temporary offset value of the angular velocity sensor while changing combination of the measurement data and the angular velocity obtained by the obtaining unit in accordance with the running condition of the object estimated by the estimating unit; and an offset value filter process unit operative to derive an offset value of the angular velocity sensor for correcting the angular velocity output from the angular velocity sensor by executing statistical process on the temporary offset value of the angular velocity sensor sequentially derived by the offset value deriving unit. The offset value filter process unit changes a forgetting factor in the statistical process in accordance with the running condition of the object estimated by the estimating unit.

In this aspect, the temporary offset value according to the running condition is derived and, by performing the statistical process on the temporary offset value using a forgetting factor according to the running condition, the offset value is derived. Therefore, even in short time after startup, the precision of deriving the offset value can be improved.

The estimating unit estimates that the running condition of the object is either a first state as a state in which the object stops or runs straight or a second state as the other state. When the estimating unit estimates that the running condition of the object is the first state, the offset value deriving unit sequentially derives a temporary offset value of the angular velocity sensor on the basis of the angular velocity obtained by the obtaining unit. When the estimating unit estimates that the running condition of the object is the second state, the offset value deriving unit sequentially derives the temporary offset value of the angular velocity sensor on the basis of the measurement data and the angular velocity obtained by the obtaining unit. The offset value filter process unit may use a forgetting factor by which influence of the temporary offset value obtained in the past, in derivation of the offset value of the angular velocity sensor in the first state becomes smaller than that in the second state in the statistical process. In this case, since two states are specified as the running conditions and two kinds of methods of deriving the temporary offset value and two forgetting factors are prepared, the process can be facilitated.

The measurement data obtained by the obtaining unit includes velocity of the object. The estimating unit estimates that the running condition of the object is a first state as a state where the object stops, a second state as a state where the object runs straight, or a third state as the other state. When the estimating unit estimates that the running condition of the object is the first state or the second state, the offset value deriving unit sequentially derives a temporary offset value of the angular velocity sensor on the basis of the angular velocity obtained by the obtaining unit. When the estimating unit estimates that the running condition of the object is the third state, the offset value deriving unit sequentially derives the temporary offset value of the angular velocity sensor on the basis of the measurement data and the angular velocity obtained by the obtaining unit. The offset value filter process unit may use a forgetting factor by which influence of the temporary offset value obtained in the past, in derivation of the offset value of the angular velocity sensor decreases in order of the first state, the second state, and the third state in the statistical process. In this case, since three states are specified as the running conditions and three kinds of methods of deriving the temporary offset value and three forgetting factors are prepared, the process precision can be improved.

The angular velocity sensor correcting apparatus may further include: an angular velocity conversion coefficient deriving unit operative to sequentially derive a temporary angular velocity conversion coefficient of the angular velocity sensor on the basis of the measurement data and the angular velocity obtained by the obtaining unit; and a sensitive coefficient filter process unit operative to derive an angular velocity conversion coefficient of the angular velocity sensor for correcting angular velocity output from the angular velocity sensor by executing statistical process on the temporary angular velocity conversion coefficient of the angular velocity sensor sequentially derived by the angular velocity conversion coefficient deriving unit. The angular velocity conversion coefficient filter process unit may change a forgetting factor in statistical process in accordance with an operation period of the angular velocity sensor. In this case, a temporary angular velocity conversion coefficient is derived and an angular velocity conversion coefficient is derived by performing the statistical process on the temporary angular velocity conversion coefficient using a forgetting factor according to the operation period of the angular velocity sensor. Therefore, even in short time after startup, the precision of deriving the angular velocity conversion coefficient can be improved.

Another aspect of the present invention relates to an angular velocity sensor correcting method. The method includes: obtaining measurement data of an object measured on the basis of a signal from a GPS satellite and angular velocity of the object output from an angular velocity sensor; estimating a running condition of the object on the basis of the measurement data and the angular velocity obtained; sequentially deriving a temporary offset value of the angular velocity sensor while changing combination of the measurement data and the angular velocity obtained in accordance with the estimated running condition of the object; and deriving an offset value of the angular velocity sensor for correcting the angular velocity output from the angular velocity sensor by executing statistical process on the temporary offset value of the angular velocity sensor sequentially derived. In the step of deriving the offset value of the angular velocity sensor, a forgetting factor in the statistical process is changed in accordance with the estimated running condition of the object.

As aspects of the present invention, the components may be arbitrarily combined and the expression of the present invention may be changed among methods, apparatus, systems, recording media, computer programs, and the like.

BRIEF DESCRIPTION OF THE DRAWINGS

FIG. 9 is a diagram showing data structure of a table stored in a forgetting factor setting unit in a second embodiment of the present invention.

DETAILED DESCRIPTION

First Embodiment

Figure 1:
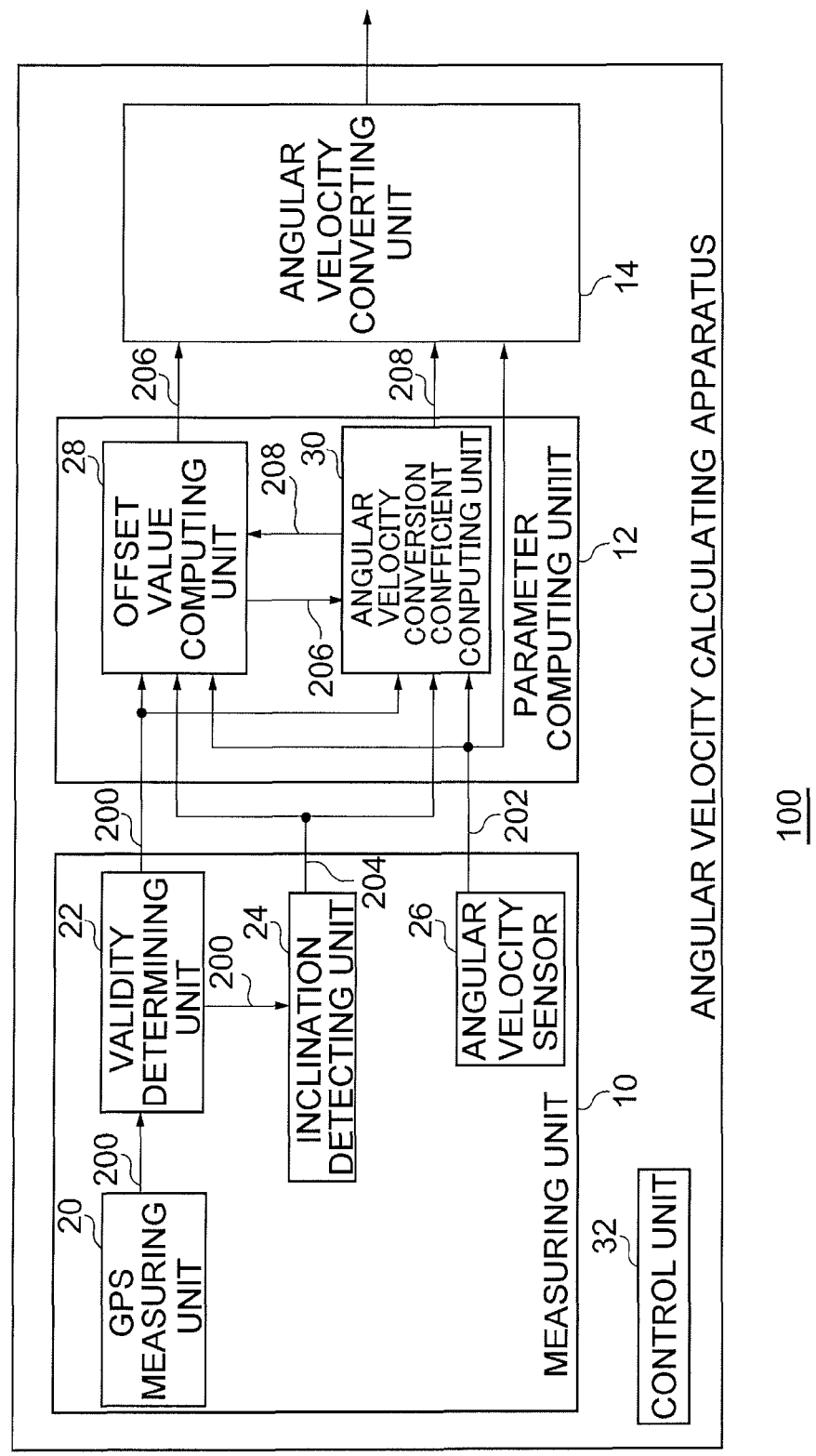
FIG. 1 is a diagram showing the configuration of an angular velocity calculating apparatus as a first embodiment of the present invention.

Prior to concrete description of the present invention, outline will be described first. An embodiment of the present invention relates to an angular velocity calculating apparatus mounted on a vehicle or the like and for deriving angular velocity accompanying turn of a vehicle. The angular velocity calculating apparatus derives angular velocity using an offset value and an angular velocity conversion coefficient for an output voltage from an angular velocity sensor. As described above, for a predetermined period since startup, the angular velocity sensor is influenced by fluctuations in temperature, so that an offset value is not accurately derived. An error in the offset value exerts an influence on calculation precision of the angular velocity conversion coefficient. As a result, in such a state, precision of angular velocity deteriorates. To address the problem, the angular velocity calculating apparatus of the embodiment executes the following process.

The angular velocity calculating apparatus receives output voltage from the angular velocity sensor mounted on the vehicle and receives measurement data from a GPS receiver mounted on the vehicle. The output voltage from the angular velocity sensor corresponds to angular velocity of the vehicle. The measurement data includes the orientation of the vehicle, velocity of the vehicle, altitude of the vehicle, and the like. The angular velocity calculating apparatus estimates a running condition of the vehicle on the basis of the measurement data and the output voltage. As the running condition, for example, any of a stop state, a straight running condition, and a non-straight-running condition is specified. The angular velocity calculating apparatus also sequentially derives a temporary offset value by a deriving method according to the running condition. Further, the angular velocity calculating apparatus executes a filtering process on the temporary offset value sequentially derived. In the embodiment, the filter corresponds to a low-pass filter. A forgetting factor which is set in the filter is determined according to the running condition. For example, in the stop state or the straight running condition, since the precision of the temporary offset value is high, a forgetting factor which reduces the influence of a value in the past is set. On the other hand, in the non-straight-running condition, the precision of the temporary offset value is low, so that the forgetting factor which increases the influence of a value in the past is set. The output value of the filter corresponds to the offset value.

The angular velocity calculating apparatus sequentially calculates a temporary angular velocity conversion coefficient on the basis of the measurement data and the output voltage. The angular velocity calculating apparatus executes the filtering process on the temporary angular velocity conversion coefficient which is sequentially derived in a manner similar to the case of the offset value. The forgetting factor to be set in the filter is set in accordance with the operation period of the angular velocity calculating apparatus. For example, immediately after startup, a forgetting factor that decreases the influence of a value in the past is set. On the other hand, after a predetermined period since startup, a forgetting factor that increases the influence of a value in the past is set. The output value of the filter corresponds to the angular velocity conversion coefficient. Finally, the angular velocity calculating apparatus calculates angular velocity on the basis of the output voltage from the angular velocity sensor, the offset value, and the angular velocity conversion coefficient.

FIG. 1 shows the configuration of an angular velocity calculating apparatus 100 according to a first embodiment of the present invention. The angular velocity calculating apparatus 100 includes a measuring unit 10, a parameter calculating apparatus 12, an angular velocity converting unit 14, and a control unit 32. The measuring unit 10 includes a GPS measuring unit 20, a validity determining unit 22, an inclination detecting unit 24, and an angular velocity sensor 26. The parameter calculating apparatus 12 includes an offset value computing unit 28 and an angular velocity conversion coefficient computing unit 30. As signals, GPS measurement data 200, an output signal 202, an inclination angle 204, an offset value 206, and an angular velocity conversion coefficient 208 are included.

The GPS measuring unit 20 receives a signal from a not-shown GPS satellite and calculates the GPS measurement data 200. The GPS measurement data 200 includes longitude and latitude, GPS altitude as the altitude of the vehicle, GPS speed as running speed, GPS orientation as the orientation of the vehicle, Position Dilution Precision (PDOP), the number of satellites caught, and the like. The PDOP is an index indicating how an error of the GPS satellite position in the GPS measurement data 200 is reflected in a reception point position and corresponds to a measurement error. The GPS measurement data 200 may include other data. Since it is sufficient to calculate the GPS measurement data 200 by a known technique, description of calculation will not be described here. The GPS measuring unit 20 calculates the GPS measurement data 200 every sampling interval, that is, periodically. The GPS measuring unit 20 sequentially outputs the GPS measurement data 200 to the validity determining unit 22.

The validity determining unit 22 sequentially receives the GPS measurement data 200 from the GPS measuring unit 20. The validity determining unit 22 determines effectiveness of each of the GPS measurement data 200 from the GPS measurement data 200. For example, when the value of PDOP is equal to or less than a first threshold and the GPS speed is equal to or larger than a second threshold, the validity determining unit 22 determines that a GPS orientation corresponding to the values is effective. When the above-described conditions are not satisfied, the validity determining unit 22 determines that the corresponding GPS orientation is invalid. The reason is that, generally, when the value of the PDOP is large or the GPS speed is low, there is tendency that the precision of the GPS orientation is low. More concretely, when the value of PDOP is 6 or less and the GPS speed is 20 km/h or higher, the validity determining unit 22 expresses the effectiveness of the GPS orientation by a flag.

When the GPS speed is equal to or larger than a third threshold value, the validity determining unit 22 determines that the GPS speed is valid. The third threshold may be the same as the second threshold. Further, when the difference in the GPS altitude in a predetermined period is equal to or less than a fourth threshold, the validity determining unit 22 determines that the GPS altitude is valid. As a result of such a process, the validity determining unit 22 adds a flag indicative of validity or invalidity to each of the values such as the GPS orientation included in the GPS measurement data 200 (hereinbelow, the GPS measurement data 200 to which the flag is added will be also called "GPS measurement data 200"). The validity determining unit 22 sequentially outputs the GPS measurement data 200 to the inclination detecting unit 24, the offset value computing unit 28, and the angular velocity conversion coefficient computing unit 30.

The inclination detecting unit 24 sequentially receives the GPS measurement data 200, particularly, the GPS altitude included in the GPS measurement data 200 from the validity determining unit 22. The inclination detecting unit 24 detects average inclination angle (hereinbelow, called "inclination angle 204") of the vehicle in the sampling interval on the basis of the sequentially input GPS altitude. Concretely, the inclination detecting unit 24 sequentially calculates the difference in continuous GPS altitudes, averages them, and divides an average value by the sampling interval, thereby deriving the inclination angle 204. The interval of the continuous GPS altitudes corresponds to the sampling interval. The inclination detecting unit 24 outputs the inclination angle 204 to the offset value computing unit 28 and the angular velocity conversion coefficient computing unit 30.

The angular velocity sensor 26 corresponds to, for example, a gyro apparatus such as a vibration gyro apparatus and detects a change in the running direction of the vehicle as a relative angle change of the vehicle. That is, the angular velocity sensor 26 detects a turn angular velocity of the vehicle. The detected angular velocity is output as, for example, an analog signal of 0 V to 5 V. A positive angular velocity corresponding to a clockwise turn is output as a deviation voltage from 2.5 V to the 5 V side, and a negative angular velocity corresponding to a counterclockwise turn is output as a deviation voltage from 2.5 V to the 0 V side. The voltage of 2.5 V is the offset value of the angular velocity, that is, zero point, which is influenced by a temperature or the like and drifts.

The angular velocity conversion coefficient (mV/deg/sec) as the degree of deviation of the angular velocity from 2.5 V is determined as a predetermined value which lies in an allowable range of error in a horizontal state. The sources of the allowable error are the individual differences and aging changes of gyro apparatus, the influence of temperature, and the like. A voltage value of the gyro apparatus is A/D converted, for example, at a sampling interval of 100 msec by a not-shown AD (Analog to Digital) converter, and a digital signal as a resultant signal is output. The digital signal corresponds to the output voltage. In the following, as the digital signal, the term of the output signal 202 will be used. As a gyro apparatus, it is sufficient to use a known technique. The description of the gyro apparatus will not be given here. The angular velocity sensor 26 outputs the output signal 202 to the offset value computing unit 28, the angular velocity conversion coefficient computing unit 30, and the angular velocity converting unit 14.

The offset value computing unit 28 receives the GPS measurement data 200 from the validity determining unit 22, the inclination angle 204 from the inclination detecting unit 24, and the output signal 202 from the angular velocity sensor 26. The offset value computing unit 28 also receives the angular velocity conversion coefficient 208 from the angular velocity conversion coefficient computing unit 30. The offset value computing unit 28 calculates an offset value (hereinbelow, called "offset value 206") of the angular velocity sensor 26 on the basis of the GPS measurement data 200, the output signal 202, the inclination angle 204, and the angular velocity conversion coefficient 208. The details of the process in the offset value computing unit 28 will be described later. The offset value computing unit 28 outputs the offset value 206 to the angular velocity converting unit 14.

The angular velocity conversion coefficient computing unit 30 receives the GPS measurement data 200 from the validity determining unit 22, the inclination angle 204 from the inclination detecting unit 24, and the output signal 202 from the angular velocity sensor 26. The angular velocity conversion coefficient computing unit 30 also receives the offset value 206 from the offset value computing unit 28. The angular velocity conversion coefficient computing unit 30 calculates angular velocity conversion coefficient (hereinbe-low, called the above-described "angular velocity conversion coefficient 208") of the angular velocity sensor 26 on the basis of the GPS measurement data 200, the output signal 202, the inclination angle 204, and the offset value 206. The details of the process in the angular velocity conversion coefficient computing unit 30 will be described later. The angular velocity conversion coefficient computing unit 30 outputs the angular velocity conversion coefficient 208 to the angular velocity converting unit 14.

The angular velocity converting unit 14 receives the output signal 202 from the angular velocity sensor 26, the offset value 206 from the offset value computing unit 28, and the angular velocity conversion coefficient 208 from the angular velocity conversion coefficient computing unit 30. The angular velocity converting unit 14 calculates angular velocity $\omega$ of the vehicle by calculating the above-described equation (1) on the basis of the output signal 202, the offset value 206, and the angular velocity conversion coefficient 208. The angular velocity converting unit 14 outputs the angular velocity w. The control unit 32 controls the operation of the entire angular velocity calculating apparatus 100.

The configuration in hardware is realized by a CPU, a memory, and another LSI of an arbitrary computer. The configuration in software is realized by a program loaded to a memory or the like. In the diagram, the functional blocks realized by coordination of the hardware and software configurations are drawn. Therefore, it is understood by a person skilled in the art that the functional blocks can be realized in various forms such as a form of only hardware, a form of only software, and a form of a combination of the hardware and software.

Figure 2:
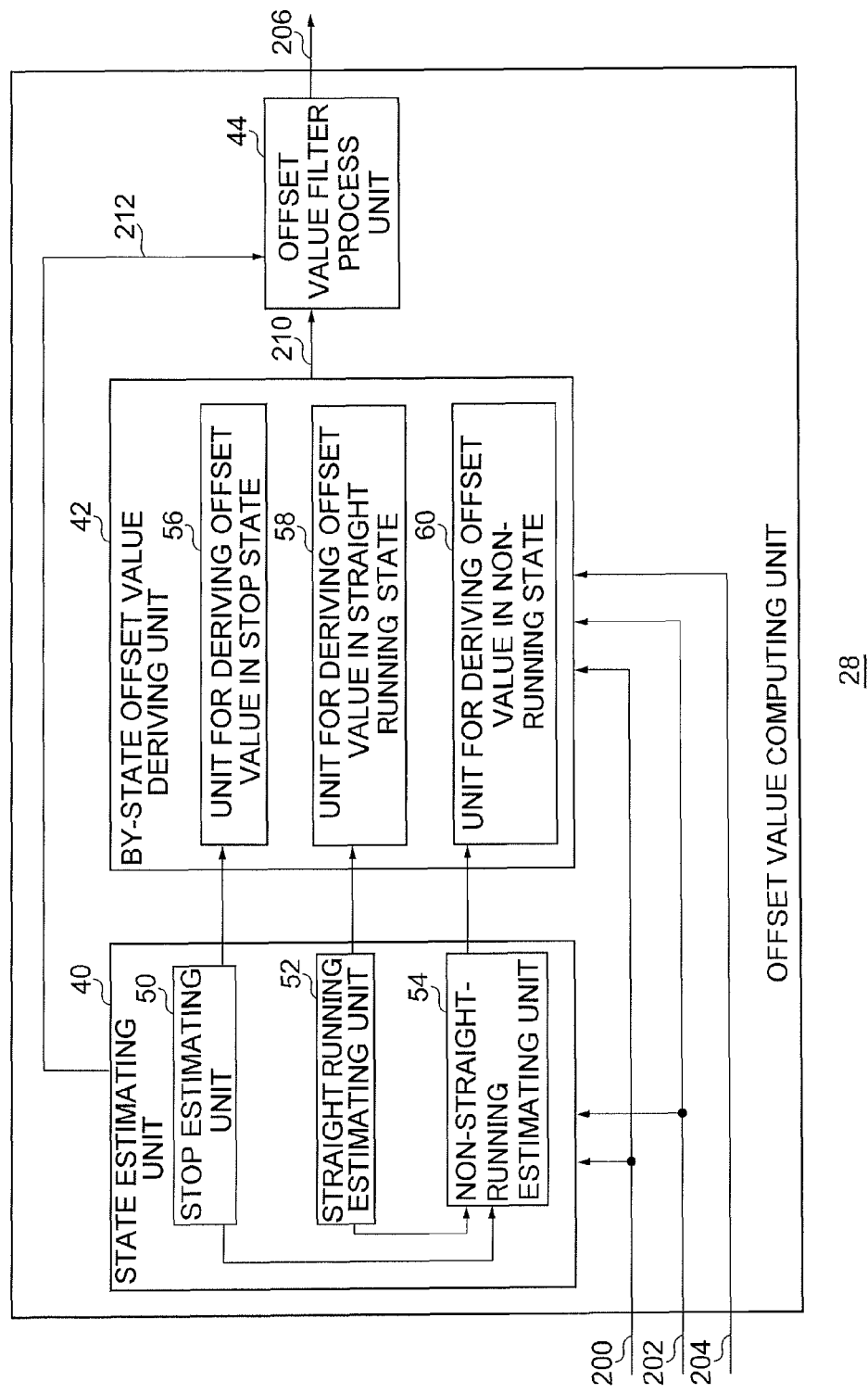
FIG. 2 is a diagram showing the configuration of an offset value computing unit in FIG. 1.

FIG. 2 shows the configuration of the offset value computing unit 28. The offset value computing unit 28 includes a state estimating unit 40, a by-state offset value deriving unit 42, and an offset value filter process unit 44. The state estimating unit 40 includes a stop-state estimating unit 50, a straight running estimating unit 52, and a non-straight-running estimating unit 54. The by-state offset value deriving unit 42 includes a unit 56 for deriving an offset value in a stop state, a unit 58 for deriving an offset value in a straight running condition, and a unit 60 for deriving an offset value in a non-straight-running condition. Further, as signals, a temporary offset value 210 and running condition information 212 are included.

The state estimating unit 40 receives the GPS measurement data 200, the output signal 202, and the inclination angle 204. The state estimating unit 40 estimates the running condition of the vehicle by the stop-state estimating unit 50, the straight running estimating unit 52, and the non-straight-running estimating unit 54. As the running condition of the vehicle, either a state where the vehicle stops or runs straight or the other state, that is, a non-straight-running condition is estimated. The state estimating unit 40 outputs the determination result as running condition information 212 to the offset value filter process unit 44.

The stop-state estimating unit 50 obtains the GPS measurement data 200 determined as valid by the not-shown validity determining unit 22. The stop-state estimating unit 50 extracts the GPS speed from the GPS measurement data 200 and confirms whether the GPS speed is "0" or not. On the other hand, the stop-state estimating unit 50 calculates a variance value of the output signal 202 in a predetermined period and compares the variance value with a fifth threshold. In the case where the GPS speed is 0 and the variance value is smaller than the fifth threshold, the stop-state estimating unit 50 determines that the vehicle is in the stop state. As described above, in the case where the GPS speed is low, there is the tendency that the precision is low. Consequently, using also the variance value of the output signal 202, the stop-state estimating unit 50 determines the stop state. The predetermined period is, for example, one second as the sampling interval of the GPS speed. In the predetermined period, when the variance value of the output signal 202 is small, a stable state in which there is no vibration in the vehicle is estimated. When the stop state is not determined, the stop-state estimating unit 50 outputs the determination result to the non-straight-running estimating unit 54.

The straight running estimating unit 52 obtains the GPS measurement data 200 determined as valid by the not-shown validity determining unit 22. The straight running estimating unit 52 extracts the GPS orientation from the GPS measurement data 200 and derives a change in the predetermined period of the GPS orientation (hereinbelow, called "GPS orientation change"). Further, the straight running estimating unit 52 confirms whether the GPS orientation change is "0" or not. The straight running estimating unit 52 calculates a variance value of the output signal 202 in the predetermined period and compares the variance value with a sixth threshold. The sixth threshold may be the same as the fifth threshold. The predetermined period is set, for example, as a period in which the GPS orientation change is continuously 0.

When the GPS orientation change is 0 and the variance value is smaller than the sixth threshold, the straight running estimating unit 52 determines that the vehicle is in the straight running condition. In the predetermined period, when the variance value of the output signal 202 is small, a straight running condition in which there is no influence of a subtle meander or the like is estimated. Although it depends on the driving state of the driver and road shapes, for example, in urban areas and the like, the frequency of detecting the straight running condition is generally lower than that of determination of the stop state by the stop-state estimating unit 50, and the period of the detection is about a few seconds. In the case where the straight running condition is not determined, the straight running estimating unit 52 outputs the result to the non-straight-running estimating unit 54. In the case where the stop-state estimating unit 50 estimates the stop state and the straight running estimating unit 52 determines the straight running condition, priority is given to the determination result of the stop-state estimating unit 50. In the case where the non-straight-running estimating unit 54 receives the result that the vehicle is not in the stop state from the stop-state estimating unit 50 and receives the result that the vehicle is not in the straight running condition from the straight running estimating unit 52, the non-straight-running estimating unit 54 determines that the vehicle is in the non-straight-running condition.

The by-state offset value deriving unit 42 receives the GPS measurement data 200, the output signal 202, the inclination angle 204, and the angular velocity conversion coefficient 208. The by-state offset value deriving unit 42 sequentially derives the temporary offset value 210 of the angular velocity sensor 26 in accordance with the running condition of the vehicle estimated by the state estimating unit 40. In the case where the stop state is determined by the stop-state estimating unit 50, the unit 56 for deriving an offset value in the stop state sequentially derives the temporary offset value 210 on the basis of the output signal 202. In the case where the straight running estimating unit 52 determines the straight running condition, the unit 58 for deriving an offset value in the straight running condition sequentially derives the temporary offset value 210 on the output signal 202.

In the case where the unit 58 for deriving an offset value in the straight running condition determines the non-linear running condition, the unit 60 for deriving an offset value in the non-linear running condition sequentially derives the temporary offset value 210 on the basis of the GPS measurement data 200, the output signal 202, the inclination angle 204, and the angular velocity conversion coefficient 208. That is, according to the running condition of the vehicle, the unit 60 for deriving an offset value in the non-straight-running condition derives the temporary offset value 210 from the unit 56 for deriving an offset value in the stop state while changing a combination of the GPS measurement data 200, the output signal 202, and the like.

In the case where the stop state is determined, the unit 56 for deriving an offset value in the stop state sequentially derives the temporary offset value 210 of the angular velocity sensor 26 on the basis of the output signal 202. Concretely, using the fact that the turn angular velocity of the vehicle becomes "0" at the time of stop, the unit 56 for deriving an offset value in the stop state calculates an average value of the output signal 202 as the temporary offset value 210. When the straight running condition is determined, the unit 58 for deriving an offset value in the straight running condition sequentially derives the temporary offset value 210 of the angular velocity sensor 26 on the basis of the output signal 202. Concretely, since the turn angular velocity of the vehicle is 0 in this case as well, the unit 58 for deriving an offset value in the straight running condition calculates the average value of the output signal 202 as the temporary offset value 210.

In the case where the non-straight-running condition is determined, the unit 60 for deriving an offset value in the non-straight-running condition sequentially derives, for example, the temporary offset value 210 in the sampling interval of the GPS orientation on the basis of the GPS orientation, the inclination angle 204, the output signal 202, and the angular velocity conversion coefficient 208 in the GPS measurement data 200. The temporary offset value 210 is derived as follows.

$$Goffset = 1/n \cdot \Sigma Gout - \Delta\theta \cdot Gsensitivity \cdot \cos(\alpha) \qquad (4)$$

In the equation, "n" denotes the number of samples of the output signal 202 in the sampling interval of the GPS orientation, and ΣGout(mV) denotes a total value of the output signal 202 in the sampling interval of the GPS orientation. Δθ(deg) denotes a GPS orientation change amount, Gsensitivity (mV/deg/sec) denotes the angular velocity conversion coefficient 208, and α(deg) denotes the inclination angle 204 of the vehicle.

Usually, the angular velocity conversion coefficient 208 is input from the not-shown angular velocity conversion coefficient computing unit 30. There is the possibility that the angular velocity conversion coefficient 208 is not calculated yet in a state such as immediately after start of the angular velocity calculating apparatus 100. In such a case, the unit 60 for deriving an offset value in the non-straight running condition uses, as the initial value, the angular velocity conversion coefficient 208 determined according to the specifications of the not-shown gyro apparatus. The unit 60 for deriving an offset value in the non-straight-running condition may store the angular velocity conversion coefficient 208 from the angular velocity conversion coefficient computing unit 30 at the end of running of last time and use it as the initial value.

The offset value filter process unit 44 receives the temporary offset value 210 sequentially derived by the by-state offset value deriving unit 42. The offset value filter process unit 44 derives the offset value 206 of the angular velocity sensor 26 by executing statistical process on the temporary offset value 210. In the following, the process in the offset value filter process unit 44 will be described with reference to FIG. 3.

Figures 3, 4:
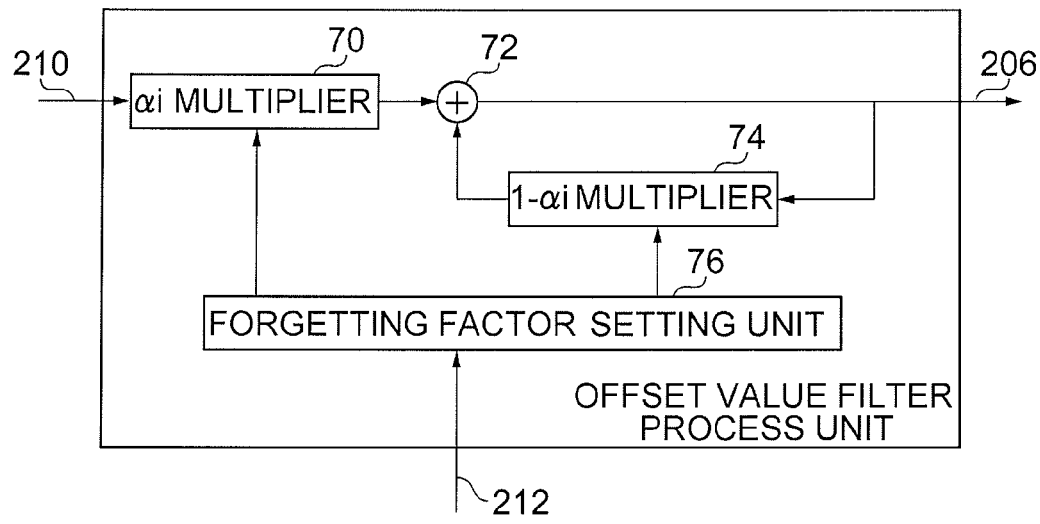
FIG. 3 is a diagram showing the configuration of an offset value filtering unit in FIG. 1.
FIG. 4 is a diagram showing data structure of a table stored in a forgetting factor setting unit in FIG. 3.

FIG. 3 shows the configuration of the offset value filter process unit 44. The offset value filter process unit 44 includes an αi multiplier 70, an adder 72, α1-αi multiplier 74, and a forgetting factor setting unit 76. As shown in the diagram, the offset value filter process unit 44 includes an Infinite Impulse Response (IIR) filter. By the IIR filter, a low-pass filter is constructed. The αi multiplier 70 multiplies the temporary offset value 210 with a forgetting factor "αi". In this case, "i" denotes 1 or 2. Consequently, the forgetting factor "αi" is generic term of α1 and α2. The generic term of α1 and α2 will be described later. The αi multiplier 70 outputs the multiplication result to the adder 72.

The adder 72 sequentially adds the multiplication result from the αi multiplier 70 and the multiplication result from the 1-αi multiplier 74. The adder 72 sequentially outputs the addition result as the offset value 206. The 1-αi multiplier 74 multiplies the offset value 206 with the coefficient "1-αi". "αi" in the coefficient "1-αi" is similar to "αi" in the αi multiplier 70, and will not be described here. The 1-αi multiplier 74 feeds back the multiplication result to the adder 72. The forgetting factor setting unit 76 receives the running condition information 212. The forgetting factor setting unit 76 determines the value of the forgetting factor "αi" in accordance with the state indicated by the running condition information 212. Further, the forgetting factor setting unit 76 sets the determined forgetting factor "αi" into the αi multiplier 70 and the 1-αi multiplier 74.

FIG. 4 shows the data structure of a table stored in the forgetting factor setting unit 76. As shown in the diagram, a running condition column 300 and a forgetting factor column 302 are included. The running condition column 300 includes states indicated by the running condition information 212. In the forgetting factor column 302, the forgetting factors "αi" corresponding to the states are stored. That is, the forgetting factor "α1" is associated with the stop state and the straight running condition, and the forgetting factor "α2" is associated with the non-straight running condition. The relation of α2<α1 is specified. Referring again to FIG. 3, the forgetting factor setting unit 76 selects the forgetting factor "α1" or "α2" from the states indicated by the running condition information 212 with reference to the table of FIG. 4. The forgetting factor setting unit 76 changes a forgetting factor in the filter process in accordance with the running condition of the vehicle.

The reason of changing the forgetting factor will be described. According to the configuration of the offset value filter process unit 44, Voffset(t) of the offset value 206 at time "t" is expressed as follows:

$$V\text{offset}(t) = \alpha i G\text{offset}(t) + (1-\alpha i) V\text{offset}(t-1) \quad (5)$$

Goffset(t) is the temporary offset value 210 at time "t". That is, when αi increases, the influence of Goffset(t) in Voffset(t) increases, αi decreases, and the influence of Voffset(t−1) in Voffset(t) increases. It corresponds to increase in the influence of the new temporary offset value 210 in the former case, and increase in the influence of the temporary offset value 210 in the past in the latter case.

For example, in the stop state or the straight running condition, the temporary offset value 210 is derived from the output signal 202 in the state where the turn angular velocity of the vehicle is 0, so that the reliability of the temporary offset value 210 is high. On the offset value 206 sequentially derived in those states, averaging process using a weight of the newly derived temporary offset value 210 which is heavier than that in the non-straight running condition is performed. It corresponds to usage of a forgetting factor which reduces the influence of the temporary offset value 210 in the past.

On the other hand, in the non-straight-running condition, there is the possibility that an error or the like is included in Δθ obtained from the GPS orientation change amount of the equation (4) and the average inclination angle α of the vehicle. Since drifts in the temporary offset value 210 are due to the influence of temperature and the like, it is estimated that the drifts in the temporary offset value 210 have a characteristic having certain continuity. Consequently, by using a low-pass filter adapted to the characteristic, an error included in the offset value derived from the equation (4) can be absorbed. Concretely, the low-pass filter adapted to the characteristic corresponds to usage of a forgetting factor which increases the influence of the temporary offset value 210 in the past.

Figures 5, 6:
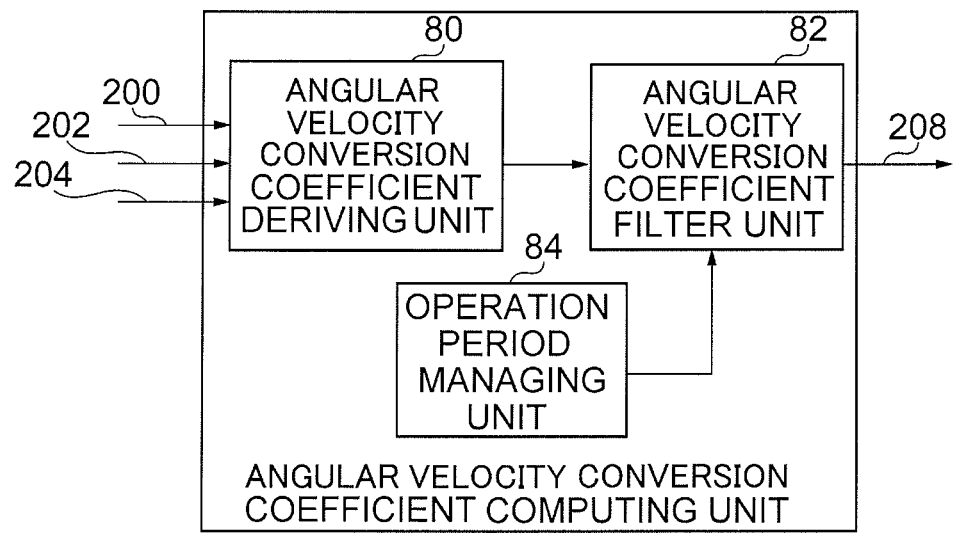
FIG. 5 is a diagram showing the configuration of an angular velocity conversion coefficient computing unit in FIG. 1.
FIG. 6 is a diagram showing data structure of a table stored in an angular velocity conversion coefficient filter unit in FIG. 5.

FIG. 5 shows the configuration of the angular velocity conversion coefficient computing unit 30. The angular velocity conversion coefficient computing unit 30 includes an angular velocity conversion coefficient deriving unit 80, an angular velocity conversion coefficient filter unit 82, and an operation period managing unit 84. The angular velocity conversion coefficient deriving unit 80 receives the GPS measurement data 200, the output signal 202, and the inclination angle 204. The angular velocity conversion coefficient computing unit 30 also receives the offset value 206. The angular velocity conversion coefficient deriving unit 80 sequentially derives a temporary angular velocity conversion coefficient of the angular velocity sensor 26 on the basis of the GPS measurement data 200, the output signal 202, the inclination angle 204, and the offset value 206.

Concretely, in the case where it is shown that the GPS orientation is valid in the GPS measurement data 200, the angular velocity conversion coefficient deriving unit 80 calculates a temporary angular velocity conversion coefficient of the angular velocity sensor 26 in the sampling interval of the GPS orientation as follows:

$$G\text{sensitivity} = (1/n \cdot \Sigma G\text{out} - G\text{offset})/\Delta\theta/\cos(\alpha) \quad (6)$$

Goffset is input from the not-shown offset value computing unit 28. There is the possibility that the offset value 206 is not calculated yet in a state such as immediately after startup of the angular velocity calculating apparatus 100. Since the equation (6) includes division with Δθ, when Δθ is equal to or larger than a predetermined value, the angular velocity conversion coefficient is calculated. When the value of Δθ is equal to or less than the predetermined value, the angular velocity conversion coefficient deriving unit 80 outputs an angular velocity conversion coefficient corrected just before.

The angular velocity conversion coefficient filter unit 82 receives a temporary angular velocity conversion coefficient sequentially derived by the angular velocity conversion coefficient deriving unit 80. The angular velocity conversion coefficient filter unit 82 derives the angular velocity conversion coefficient 208 of the angular velocity sensor 26 by executing statistical process on the temporary angular velocity conversion coefficient. Like the offset value filter process unit 44 shown in FIG. 4, the angular velocity conversion coefficient filter unit 82 includes an IIR filter. The IIR filter serves as a low-pass filter. As a result, an error included in Δθ derived from the GPS orientation change amount in the equation (6) and the average inclination angle α of the vehicle is absorbed. The angular velocity conversion coefficient filter unit 82 sets a forgetting factor in the IIR filter on the basis of an instruction from the operation period managing unit 84.

The operation period managing unit 84 changes the forgetting factor in the angular velocity conversion coefficient filter unit 82 in accordance with the operation period of the angular velocity sensor 26. The operation period managing unit 84 instructs the angular velocity conversion coefficient filter unit 82 to use the changed forgetting factor. FIG. 6 shows the data structure of a table stored in the angular velocity conversion coefficient filter unit 82. As shown in the diagram, a condition column 310 and a forgetting factor column 312 are indicated. In the condition column 310, as conditions related to the operation period for determining the forgetting factor, "x hours or less" and "longer than x hours" are shown. In the forgetting factor column 312, the value of the forgetting factor corresponding to the condition in the condition column 310 is shown. Concretely, the forgetting factor $\alpha 10$ is set for the condition of "x hours or less". The forgetting factor $\alpha 11$ is specified for the condition for the condition of "longer than x hours". The relation of $\alpha 11 < \alpha 10$ is specified. To be specific, for the case of x hours or less from startup, averaging process using the weight of the newly derived temporary offset value 210 heavier than that in the case longer than x hours since startup is performed.

Although the example of calculating a temporary angular velocity conversion coefficient in the sampling interval of the GPS orientation has been described above, in the case where fluctuations in Goffset and $\alpha$ are subtle, or the case where the value of $\Delta\theta$ is not equal to or larger than the predetermined value, the interval of calculation may be wider. That is, derivation of the temporary angular velocity conversion coefficient is not limited to the sampling interval of the GPS orientation.

Figure 7:
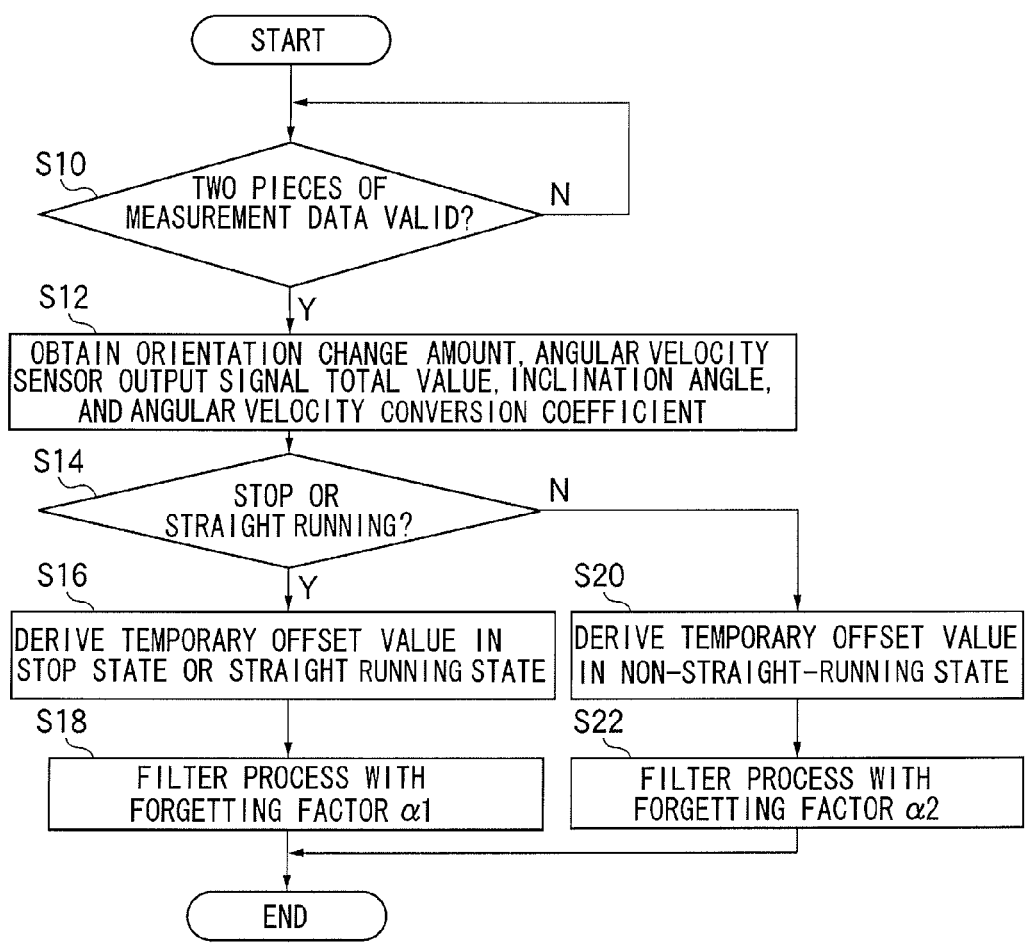
FIG. 7 is a flowchart showing procedure of deriving an offset value by the angular velocity calculating apparatus of FIG. 1.

The operation of the angular velocity calculating apparatus 100 having the above-described configuration will be described. FIG. 7 is a flowchart showing procedure of deriving an offset value by the angular velocity calculating apparatus 100. The validity determining unit 22 determines validity of two pieces of the GPS measurement data 200 measured by the GPS measuring unit 20 (S10). The two pieces of GPS measurement data 200 correspond to the GPS measurement data 200 at timings apart only by sampling interval time. When at least one piece of GPS measurement data 200 are not valid (N in S10), the apparatus waits. When both of them are valid (Y in S10), the offset value computing unit 28 obtains the GPS orientation change amount of the vehicle in the sampling interval of the GPS measurement data 200, the total value of the output signal 202 of the angular velocity sensor 26, the inclination angle 204 of the vehicle output from the inclination detecting unit 24, and the angular velocity conversion coefficient 208 output from the angular velocity conversion coefficient computing unit 30 (S12).

The state estimating unit 40 determines whether the running condition of the vehicle is the stop state or the straight running condition on the basis of the various information obtained (S14). In the stop or straight running condition (Y in S14), the unit 56 for deriving an offset value in the stop state or the unit 58 for deriving an offset value in the straight running condition calculates the temporary offset value 210 of the angular velocity sensor 26 on the basis of the various information obtained (S16). The offset value filter process unit 44 executes the filter process with a forgetting factor $\alpha 1$ (S18). On the other hand, when the vehicle is not in the stop or straight running condition (N in S14), the unit 60 for deriving an offset value in the non-straight running condition calculates the temporary offset value 210 of the angular velocity sensor 26 on the basis of the obtained various information (S20). The offset value filter process unit 44 executes the filter process with a forgetting factor $\alpha 2$ (S22).

Figure 8:
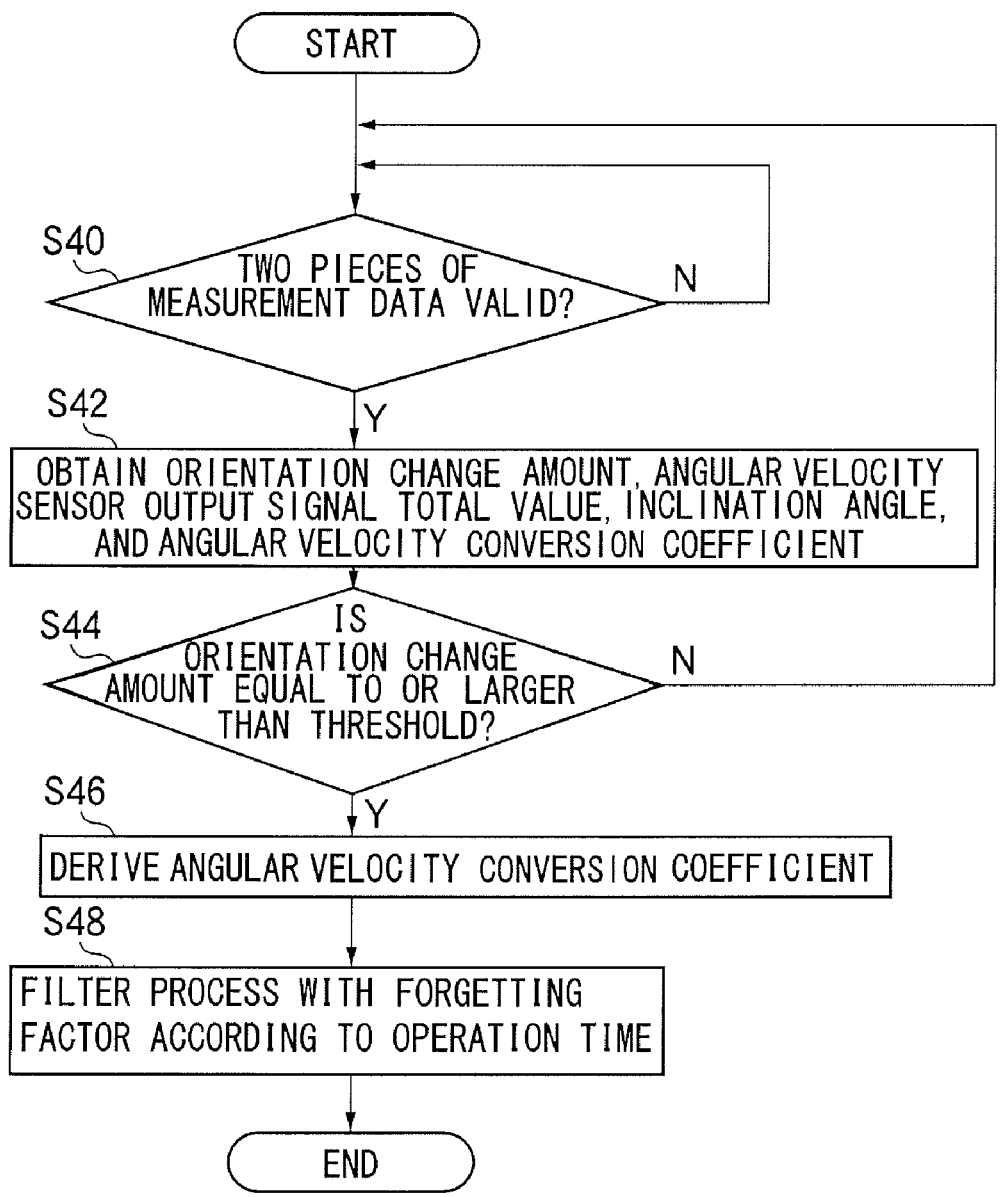
FIG. 8 is a flowchart showing procedure of deriving angular velocity conversion coefficient by the angular velocity calculating apparatus of FIG. 1.

FIG. 8 is a flowchart showing procedure of deriving an angular velocity conversion coefficient by the angular velocity calculating apparatus 100. The validity determining unit 22 determines validity of the two pieces of the GPS measurement data 200 measured by the GPS measuring unit 20 (S40). The two pieces of GPS measurement data 200 correspond to the GPS measurement data 200 at timings apart only by sampling interval time. When at least one piece of GPS measurement data 200 are not valid (N in S40), the apparatus waits. When both of them are valid (Y in S40), the angular velocity conversion coefficient computing unit 30 obtains the GPS orientation change amount of the vehicle in the sampling interval of the GPS measurement data 200, the total value of the output signal 202 of the angular velocity sensor 26, the inclination angle 204 of the vehicle output from the inclination detecting unit 24, and the angular velocity conversion coefficient 208 output from the angular velocity conversion coefficient computing unit 30 (S42).

When the angular velocity conversion coefficient deriving unit 80 determines that the GPS orientation change amount obtained is not equal to or larger than the predetermined value (N in S44), the apparatus returns to step S40. On the other hand, when the angular velocity conversion coefficient deriving unit 80 determines that the GPS orientation change amount obtained is equal to or larger than the predetermined value (Y in S44), a temporary angular velocity conversion coefficient of the angular velocity sensor 26 is derived on the basis of the obtained various information (S46). The angular velocity conversion coefficient filter unit 82 executes the filter process on the temporary angular velocity conversion coefficient with a forgetting factor according to the operation time (S48).

In the embodiment of the present invention, by deriving the temporary offset value according to the running condition and performing the filter process on the temporary offset value using the forgetting factor according to the running condition, the offset value is derived. Even in short time after startup, an error included in the offset value can be reduced. Since an error included in the offset value is reduced, the precision of deriving the offset value can be improved. The inclination angle of the vehicle is also considered for the offset value of the angular velocity sensor, the derivation precision can be further improved. The optimum offset value according to the running condition of the vehicle is derived in short time such as the sampling interval of the GPS orientation, so that drifts in the offset value can be tracked with high precision.

The temporary angular velocity conversion coefficient is derived and, by performing the filter process on the temporary angular velocity conversion coefficient using the forgetting factor according to the operation period of the angular velocity sensor, the angular velocity conversion coefficient is derived. Consequently, even in short time after startup, an error included in the angular velocity conversion coefficient can be reduced. Since an error included in the angular velocity conversion coefficient is reduced, the precision of deriving the angular velocity conversion coefficient can be improved. Since two states are substantially specified as running conditions and two kinds of methods of deriving temporary offset values and the forgetting factors $\alpha 1$ and $\alpha 2$ are prepared, the process can be simplified. The angular velocity conversion coefficient of the angular velocity sensor is also calculated in consideration of the inclination angle of the vehicle and its fluctuations, so that the derivation precision can be improved also in the running condition of an inclined road. Since drifts in the offset value can be addressed with high precision, the angular velocity conversion coefficient can be derived accurately immediately after startup of the navigation apparatus.

Since the precision of deriving the offset value and the angular velocity conversion coefficient is improved, the angular velocity deriving precision can be improved.

Second Embodiment

A second embodiment relates to the angular velocity calculating apparatus 100 like the first embodiment. In the first embodiment, the running conditions are classified into the stop state, the straight running condition, and the non-straight-running condition. The by-state offset value deriving unit 42 and the offset value filter process unit 44 execute similar processes on the stop state and the straight running condition. In the first embodiment, therefore, it can be said different processes are substantially performed on the two states. On the other hand, the angular velocity calculating apparatus 100 as the second embodiment sets different values as the forgetting factor for the stop state and the forgetting factor for the straight running condition. Consequently, it can be said that different processes are performed in the three states in the second embodiment. The angular velocity calculating apparatus 100, the offset value computing unit 28, the offset value filter process unit 44, and the angular velocity conversion coefficient computing unit 30 of the second embodiment are of types similar to those of FIGS. 1, 2, 3, and 5, respectively. Therefore, the differences will be mainly described.

FIG. 9 is a diagram showing the data structure of a table stored in the forgetting factor setting unit 76 in the second embodiment of the invention. The table of FIG. 9 is shown in a manner similar to FIG. 4. In the forgetting factor column 302, the forgetting factor "α1" corresponding to the stop state, the forgetting factor "α2" corresponding to the straight running condition, and the forgetting factor "α3" corresponding to the non-straight running condition are shown. The relation of α1>α2>α3 is specified. The influence of the past temporary offset value 210 decreases in order of the stop state, the straight running condition, and the non-straight running condition. As described above, the forgetting factor setting unit 76 selects the forgetting factor on the basis of the running condition information 212 with reference to the table. The forgetting factor setting unit 76 sets the selected forgetting factor in the αi multiplier 70 and the 1−αi multiplier 74.

In the second embodiment of the present invention, three forgetting factors are prepared for three states as the running conditions. Consequently, the filter process adapted to the three states can be realized. Since the filter process adapted to each of the states is realized, the process precision can be improved.

The present invention has been described above on the basis of the embodiments. It can be understood by a person skilled in the art that the embodiments are illustrative, combinations of the components and the processes can be variously modified, and such modifications are also in the scope of the present invention.

In the embodiments of the invention, the offset value computing unit 28 and the angular velocity conversion coefficient computing unit 30 use Δθ on the basis of the GPS orientation included in the GPS measurement data 200 at the time of calculating the equations (4) and (6). However, the invention is not limited to the embodiments. For example, the offset value computing unit 28 and the angular velocity conversion coefficient computing unit 30 may use a road orientation to which the vehicle matches using a not-shown map database. For the matching of the vehicle to the map database, the GPS measurement data 200 is used. In the modification, the degree of freedom of the configuration of the angular velocity calculating apparatus 100 can be improved.

In the embodiments of the invention, the inclination detecting unit 24 calculates the inclination angle 204 of the vehicle using the GPS altitude. However, the invention is not limited to the embodiments. For example, the inclination detecting unit 24 may have an acceleration sensor and calculates the inclination angle 204 by using the information from the acceleration sensor. In the case where altitude information exits in road information included in the not-shown map database, the inclination detecting unit 24 may use altitude information of a road to which the vehicle matches. In the modification, the inclination angle 204 can be derived with high precision.

In the embodiments of the invention, the offset value computing unit 28 and the angular velocity conversion coefficient computing unit 30 use the inclination angle 204 at the time of deriving the temporary offset value 210 and the temporary angular velocity conversion coefficient. However, the invention is not limited to the embodiments. For example, the inclination angle 204 may not be used. In this case, α in the equations (4) and (6) is set to 0. In the modification, the process can be facilitated.

In the embodiments of the invention, the state estimating unit 40 determines the stop state by using the GPS speed included in the GPS measurement data 200 as determination of the running condition of the vehicle. However, the invention is not limited to the embodiments. For example, the state estimating unit 40 receives a vehicle speed pulse signal of the vehicle from a not-shown pulse detector and determines the stop state on the basis of the vehicle speed pulse. The pulse detector is connected to a not-shown speed sensor. The speed sensor is mounted in some midpoint in a speed meter cable which rotates in correspondence with rotation of a driveshaft, and outputs a vehicle speed pulse signal accompanying the rotation of the driveshaft. In the modification, the speed of the vehicle can be measured by various means.

In the embodiments of the present invention, the validity determining unit 22 uses a PDOP to determine validity of the GPS measurement data 200. However, the invention is not limited to the embodiments. For example, the validity determining unit 22 may use a Geometric Dilution Of Precision (GDOP), a Horizontal Dilution Of Precision (HDOP), and the like or a combination of them. In the modification, various parameters can be used for determination.

In the embodiments of the invention, each of the offset value filter process unit 44 and the angular velocity conversion coefficient filter unit 82 is formed to include an IIR filter. However, the invention is not limited to the embodiments. For example, each of the offset value filter process unit 44 and the angular velocity conversion coefficient filter unit 82 may be formed so as to include a Finite Impulse Response (FIR) filter. In this case, the forgetting factor is set as a tap coefficient. In the modification, the degree of freedom of the filter configuration can be improved.

What is claimed is:

1. An angular velocity sensor correcting apparatus, including a processor and a memory storing a program for execution by the processor, the program comprising:
   an obtaining module for obtaining measurement data of an object measured on the basis of a signal from a GPS satellite, and for obtaining angular velocity of the object output from an angular velocity sensor;
   an estimating module for estimating a running condition of the object on the basis of the measurement data and the angular velocity obtained by the obtaining module;
   an offset value deriving module to sequentially derive a temporary offset value of the angular velocity sensor while changing combination of the measurement data and the angular velocity obtained by the obtaining module in accordance with the running condition of the object estimated by the estimating module; and an offset value filter process module operative to derive an offset value of the angular velocity sensor for correcting the angular velocity output from the angular velocity sensor by executing a statistical process on the temporary offset value of the angular velocity sensor, the temporary offset value sequentially derived by the offset value deriving module, wherein the estimating module estimates that the running condition of the object is either a first state, in which the object stops or runs straight, or a second state, wherein the offset value deriving module sequentially derives a temporary offset value of the angular velocity sensor on the basis of the angular velocity obtained by the obtaining module when the estimating module estimates that the running condition of the object is the first state, and the offset value deriving module sequentially derives the temporary offset value of the angular velocity sensor on the basis of the measurement data and the angular velocity obtained by the obtaining module when the estimating module estimates that the running condition of the object is the second state, and wherein the offset value filter process module changes a forgetting factor in the statistical process in accordance with the running condition of the object estimated by the estimating module, and the offset value filter process module uses a forgetting factor by which influence of the temporary offset value obtained in the past, in derivation of the offset value of the angular velocity sensor in the first state becomes smaller than that in the second state in the statistical process.

2. The angular velocity sensor correcting apparatus of claim 1, wherein the measurement data obtained by the obtaining module includes velocity of the object, wherein the estimating module also estimates that the running condition of the object is a third state where the object runs straight, wherein the offset value deriving module sequentially derives a temporary offset value of the angular velocity sensor on the basis of the angular velocity obtained by the obtaining module when the estimating module estimates that the running condition of the object is the first state or the third state, and the offset value deriving module sequentially derives the temporary offset value of the angular velocity sensor on the basis of the measurement data and the angular velocity obtained by the obtaining module when the estimating module estimates that the running condition of the object is the second state, and wherein the offset value filter process module changes a forgetting factor in the statistical process in accordance with the running condition of the object estimated by the estimating module, and the offset value filter process module uses a forgetting factor by which influence of the temporary offset value obtained in the past, in derivation of the offset value of the angular velocity sensor decreases in order of the second state, the third state, and the first state in the statistical process.

3. An angular velocity sensor correcting method, the method comprising:

obtaining, by a processor, measurement data of an object on the basis of a signal from a GPS satellite and angular velocity of the object output from an angular velocity sensor;

estimating, by a processor, a running condition of the object on the basis of the measurement data and the angular velocity;

sequentially deriving, by a processor, a temporary offset value of the angular velocity sensor while changing a combination of the measurement data and the angular velocity obtained in accordance with the estimated running condition of the object; and deriving, by a processor, an offset value of the angular velocity sensor for correcting the angular velocity output from the angular velocity sensor by executing a statistical process on the sequentially derived temporary offset value of the angular velocity sensor, wherein the estimating estimates that the running condition of the object is either a first state in which the object stops or runs straight or a second state, wherein the sequential deriving of a temporary offset value sequentially derives a temporary offset value of the angular velocity sensor on the basis of the obtained angular velocity when the running condition of the object is estimated to be the first state, and the sequential deriving of a temporary offset value sequentially derives the temporary offset value of the angular velocity sensor on the basis of the obtained measurement data and the angular velocity when the running condition of the object is estimated to be the second state, and wherein the deriving of an offset value changes a forgetting factor in the statistical process in accordance with the estimated running condition of the object and uses a forgetting factor by which influence of the temporary offset value obtained in the past, in derivation of the offset value of the angular velocity sensor in the first state becomes smaller than that in the second state in the statistical process.

4. The angular velocity sensor correcting method according to claim 3, wherein the obtained measurement data includes velocity of the object, wherein the estimating also estimates that the running condition of the object is a third state where the object runs straight, wherein the sequential deriving of a temporary offset value sequentially derives a temporary offset value of the angular velocity sensor on the basis of the obtained angular velocity when the running condition of the object is estimated to be the first state or the third state, and the sequential deriving of a temporary offset value sequentially derives the temporary offset value of the angular velocity sensor on the basis of the obtained measurement data and angular velocity when the running condition of the object is estimated to be the second state, and wherein the deriving of an offset value changes a forgetting factor in the statistical process in accordance with the estimated running condition of the object, and the deriving of an offset value uses a forgetting factor by which influence of the temporary offset value obtained in the past, in derivation of the offset value of the angular velocity sensor decreases in order of the second state, the third state, and the first state in the statistical process.

* * * * *